United States Patent Office 2,852,406
Patented Sept. 16, 1958

2,852,406

PIGMENT COMPOSITION AND PROCESS FOR ITS PRODUCTION

Werner L. Riegler, Western Springs, and Richard L. Betcher, Chicago, Ill., assignors to Armour and Company, Chicago, Ill., a corporation of Illinois No Drawing. Application November 16, 1954
Serial No. 469,318

19 Claims. (Cl. 106—304)

This invention relates to an improved pigment composition and to a process for its manufacture.

Pigments are finely divided insoluble solids which are used in many various materials such as coating compositions, rubber, etc., for many different purposes. In coating compositions they are mostly used to provide a color or hue; but they also function as opacifiers. In rubber, especially tire rubber, carbon black is used to impart strength and abrasion resistance as well as color. It is hardly possible to look around and not see some article which contains a pigment material.

In practically every application of pigmentary materials it is necessary that they be dispersed, generally in a liquid medium. Pigment dispersion, as it is encountered in the field of coating compositions, involves generally transferring a dry pigmentary material existing really as a heterogeneous dispersion in air to a dispersion in a liquid as uniform as possible. The attainment of optimum dispersion usually results in the maximum practical development of such desirable properties as tinctorial strength, opacity, gloss and uniform pigment particle distribution.

Pigment particles can be pictured as irregularly shaped solids surrounded by a bound envelope of air, gas or moisture which is to be considered distinctly different in its physical relationship to the pigment as compared with the free air that separates the pigment particles. Both the free air and the surface-bound air constitute the initial obstacle to be overcome in converting the pigment from the dispersion in the air to a dispersion in the liquid. Pigments in the dry form are generally in the form of agglomerates which may be either in a relatively loose or a compacted condition. In the dispersion process, a vehicle is added to the pigment mass in a mixing operation which is extended further by a so-called grinding operation. The dispersion processes employed by the manufacturer of coating compositions are not really true grinding operations. They do not reduce, but are intended to approach, the primary particle size of the pigment as originally manufactured. The tendency of the pigment to cluster or coalesce under the conditions of packing, shipment and storage, as well as a natural tendency of many pigments to agglomerate when initial wetting is attempted, are factors which lead one to believe that real grinding occurs in the dispersion process. Any attempt to truly grind the pigment, if actually accomplished, would probably result in mill scoring, contamination by abrasion, change in color, quality, etc.

As a result of the work done on a mixture of pigment and vehicle, a pigmented composition is obtained which may be represented by two extreme conditions, with, of course, the possibility of an actual composition which combines the characteristics of both. A poor dispersion is one in which the work done has failed to separate the pigment particles with the result that much of the original air is retained and the particles have become tightly packed into a hard aggregate as a consequence of the forces exerted. The ideal result is one in which the pigment particles have been completely separated with an envelope of adsorbed vehicle replacing the original air envelope, and free vehicle displacing the original free air.

Wetting agents are well known in the field of dispersion, and are employed in emulsification as well as in dispersing solids. Since most pigment manufacturing processes involve the formation of the same at some stage as a precipitate in an aqueous system, it is known to coat the pigment with a wetting agent to render the pigment surface more oil acceptable. However, most of the pigment wetting agents on the market today are potassium or sodium rosinates and petroleum sulphonates, which rely solely on the partial adsorption of the reagent upon the pigment in water, and are only 50% efficient. These types of compounds generally remain water-soluble, and a large portion is washed away in the filtrate when filtering the pigment.

We have discovered that if an aqueous precipitate of pigmentary material is treated in such a manner as to ultimately coat the pigment particle with a water-insoluble diacid salt of a N-aliphatic alkylene diamine, the coating will remain on the pigment during the filtration step and will act as a spacer between the pigment particles and prevent the formation of clusters of pigment particles or agglomerates. Further, the amount of time required for grinding or dispersing these improved pigments into oil or resin type vehicles is considerably diminished, and there is no adverse effect upon the properties of the resulting coating compositions.

It is, therefore, an object of the present invention to provide an improved pigment composition.

It is a further object of this invention to provide an improved process for the preparation of pigment materials.

Still another object of this invention is to provide an improved process for transferring pigmentary material from an aqueous system to an oil or resin type system.

Further additional objects of this invention will become apparent from the following description.

This invention is applicable, generally, to hydrophilic or water-wettable pigments and involves treating the pigment in an aqueous system so as to ultimately coat the pigment particles with a strongly adsorbed water-insoluble salt of a N-aliphatic alkylene diamine. According to a preferred modification of our invention, a small amount of a water-soluble salt of a N-aliphatic alkylene diamine is admixed with a slurry of water-wet pigment material, preferably at a stage in its manufacture prior to drying, and agitated for a time sufficient to adsorb the water-soluble salt onto the surface of the pigment particles, generally about 10 to 15 minutes. Next a stoichiometric quantity of a compound selected from the group consisting of RCOOZ and R—NH—A—COOZ wherein R is an aliphatic hydrocarbon radical having from 12 to 22 carbon atoms, Z is an alkali metal, and A is a divalent aliphatic hydrocarbon radical having from 2 to 3 carbon atoms, is added and the agitation continued whereby a water-insoluble, oil-soluble diacid salt is coated upon the surface of the pigment particles in a quantity ranging from ½ to 4 weight percent, and the alkali metal salt reaction product is dissolved in the aqueous phase.

The coated pigment can then be collected in a filter and dried in an oven at about 95 to 110° C., while the clear filtrate containing the dissolved alkali metal salt is discarded. The coated pigment is now ready for incorporation into an oil or oleoresinous vehicle and will disperse with much less effort than an uncoated pigment.

It will be appreciated that the order of addition of the water-soluble diamine salt and the alkali metal salt can be reversed. That is, the alkali metal salt or soap can first be admixed with the aqueous pigment system followed by the addition of the water-soluble salt of the diamine. Our experience has been that the order of addition is not critical. However, it is preferred to add the water-soluble salt of the diamine first because of the comparative ease and strength with which it is adsorbed upon the surface of the pigment particles.

Among the diamine compounds which can be employed according to the present invention are the water-soluble salts, as for example the acetate and hydrochloride, of a N-aliphatic alkylene diamine having the formula R—NH—(CH$_2$)$_x$—NH$_2$ wherein $x$ is an integer of from 2 to 10, and R is an aliphatic hydrocarbon radical having 12 to 22 carbon atoms. R can also represent mixtures of radicals as obtained from tallow, soybean oil, coconut oil, etc. The preferred class of diamines are those in which $x$ is 3, or N-aliphatic trimethylene diamines. The preferred salts are the acetates and the preferred compound is N-tallow trimethylene diamine diacetate.

The anionic compounds which can be used in accordance with the present invention are represented by the general formulas RCOOZ and R—NH—A—COOZ wherein Z is an alkali metal, A is a divalent aliphatic hydrocarbon radical having 2 to 3 carbon atoms, and R is an aliphatic hydrocarbon radical having from 12 to 22 carbon atoms. R might also represent mixtures of radicals as obtained from tallow, soybean oil, coconut oil, etc. The class of compounds represented by the first general formula are the soaps of long chain fatty acids examples of which include sodium oleate, sodium stearate, sodium palmitate, potassium oleate, etc. The preferred compound of this class is sodium oleate. The class of compounds represented by the second general formula are the alkali metal salts of N-aliphatic aminoaliohatic carboxylic acids. These compounds are formed by the reaction between a long chain amine and an unsaturated acid or ester such as crotonic, acrylic, methacrylic, etc. The preferred compound of this class is sodium N-Coco-β-aminobutyrate, formed by the reaction between Coco amine and crotonic acid. For purposes of simplicity, this compound has been designated as "A–1300," and will be so referred to in the remainder of the specification and the examples.

As an illustration of the calculations involved in determining quantities of reagents, the reaction between N-tallow trimethylene diamine diacetate and sodium oleate yields approximately 80% of coating material and 20% of sodium acetate as shown by the following reaction.

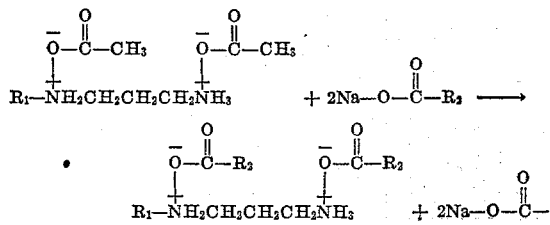

wherein R$_1$ represents a mixture of radicals as found in tallow and R$_2$ represents an oleoyl radical. If it was desired to coat 100 lbs. of pigment with 3.0 weight percent of N-tallow trimethylene diamine dioleate, the amount of reagents added to the pigment water slurry can be determined as follows: The molecular weights of N-tallow trimethylene diamine diacetate and N-tallow trimethylene dioleate are 440 and 884 respectively. 3% of 100 lbs. requires 3 lbs. of N-tallow trimethylene dioleate, which will require 3.0×440/884 or 1.49 lbs. of N-tallow trimethylene diamine diacetate. Since N-tallow trimethylene diamine diacetate is approximately 83% active the corrected quantity of diacetate will amount to 1.79 lbs. The molecular weight of sodium oleate is 304. Since 2 mols of oleate are required to replace the 2 mols of acetate, the quantity of sodium oleate will be 1×3.0×304/884 or 2.03 lbs.

This invention includes the use of the above mentioned chemical agents for treatment of aqueous systems containing all pigments, preferably hydrophilic type pigments, including such materials well known commercially as iron blue, chrome yellow, chrome orange, chrome green, zinc chromate, red lead, azo type toners, aluminum hydrate, lakes, carbon black, iron oxide, zinc oxide, titanium-containing pigments, zinc sulfide-containing pigments, white lead, extenders, etc. Although it is realized that certain of these pigments, such as carbon black are not generally an aqueous mixture ordinarily, it is to be understood that our invention is applicable to such dry pigments when they are brought into an aqueous system. Also within the scope of our invention are the above pigments, as they are ultimately coated according to the process of this invention.

By the term pigment we mean substances which are generally considered insoluble in the vehicle as distinguished from dyestuffs which are generally considered soluble. For example, pigments generally have the property of light refractivity, tending to give opacity to the system, whereas dyes generally only have the property of light absorption, tending to retain the transparency of the system.

The following examples are intended to illustrate the underlying principles of our invention and are not to be construed as unduly limiting.

EXAMPLE I

An iron blue pigment, either as a dry stock or a wet press cake, was coated with varying quantities of N-tallow trimethylene diamine dioleate or N-tallow trimethylene diamine di-A–1300, according to the preferred process of this invention as hereinabove described. All of the coated pigments along with the uncoated control samples were made into fairly high pigmented roller mill pastes and passed over a laboratory roller mill. A determination was made of grinding time, the number of passes required to produce an enamel grind, and yield value. These pastes were made into paints and checked further for rate of dry indicated by dust free time, tack free time (with Zapon tack tester), color and gloss comparison, and pencil hardness. If the drying time exceeded the normal 8-hour day, the samples were checked the following morning and were found to be equal. It was found that the coating of the pigments did not impair the final film hardness.

Table I summarizes some of the results of roller mill data obtained while Table II shows the effect of N-tallow trimethylene diamine dioleate and the corresponding di-A–1300 salt, on heat-cured and air-dried paint enamels.

Table I

| Sample Number | Pigment | Vehicle | Percent Pigment By Wt. | Percent Vehicle | Coating Material Applied From Aqueous Solution | Wetting Aid Added in Vehicle Portion | Consistency of Paste | 1st Pass Grind No. | 1st Pass Grind Time, Sec. | 2nd Pass Grind No. | 2nd Pass Grind Time, Sec. | Total Time on Mill |
|---|---|---|---|---|---|---|---|---|---|---|---|---|
| 1217 | Iron Blue Dry Stock | Castor Oil | 40 | 60 | None | None | B. | 0 | | | | |
| 1218 | ---do--- | ---do--- | 40 | 60 | ---do--- | 4.0% D.T.D.O. | S. B. | 2+ | | | | |
| 1219 | ---do--- | ---do--- | 40 | 60 | 4.0% D.T.D.O. | None | F. | 8 | | | | |
| 1230 | Iron Blue Press Cake | ---do--- | 40 | 60 | None | ---do--- | B. | 1 | 42.5 | 2 | 38.9 | 81.4 |
| 1231 | Iron Blue Dry Stock | ---do--- | 40 | 60 | ---do--- | 3.0% D.T.D.O. | S. B. | 2 | 37.5 | 8 | 42.4 | 79.9 |
| 1232 | Iron Blue Press Cake | ---do--- | 40 | 60 | 3.0% D.T.D.O. | None | <F. | 8 | 29.2 | | | 29.2 |
| 1233 | Iron Blue Dry Stock | ---do--- | 40 | 60 | 3.0% D.T.D.O. | ---do--- | <F. | 6 | 38.0 | 8 | 48.4 | 86.4 |
| 1234 | ---do--- | ---do--- | 40 | 60 | 3.0% A-1300 | ---do--- | <F. | 1 | 37.7 | 7 | 52.2 | 89.9 |
| 1235 | Iron Blue Press Cake | ---do--- | 40 | 60 | 3.0% A-1300 | ---do--- | <F. | 8 | 31.0 | | | 31.0 |
| 1236 | Iron Blue Dry Stock | Long Oil Alkyd 52-R-13 | 35 | 65 | None | ---do--- | S. B. | 1 | 15.7 | 3 | 17.1 | 32.8 |
| 1237 | Iron Blue Press Cake | ---do--- | 35 | 65 | ---do--- | ---do--- | S. B. | 0 | 18.8 | 2 | 20.8 | 39.6 |
| 1238 | Iron Blue Dry Stock | ---do--- | 35 | 65 | 3.0% D.T.D.O. | ---do--- | S. B. | 2 | 16.6 | 6 | 28.0 | 34.1 |
| 1239 | Iron Blue Press Cake | ---do--- | 35 | 65 | 3.0% D.T.D.O. | ---do--- | S. B. | 6 | 20.2 | | | 20.2 |
| 1241 | Iron Blue Dry Stock | ---do--- | 35 | 65 | 3.0% A-1300 | ---do--- | B. | 4 | Slips on Rolls | | | |
| 1243 | Iron Blue Press Cake | ---do--- | 35 | 65 | 2.0% D.T.D.O. | ---do--- | S. B. | 5 | 22.4 | 8 | 30.0 | 52.4 |
| 1244 | ---do--- | ---do--- | 35 | 65 | 3.0% D.T.D.O. | ---do--- | S. B. | 8 | 25.9 | | | 25.9 |
| 1245 | ---do--- | ---do--- | 35 | 65 | 4.0% D.T.D.O. | ---do--- | <F. | 8 | 25.8 | | | 25.8 |
| 1246 | ---do--- | ---do--- | 35 | 65 | 2.0% A-1300 | ---do--- | <F. | 5 | 21.2 | 8 | 29.5 | 50.7 |
| 1247 | ---do--- | ---do--- | 35 | 65 | 3.0% A-1300 | ---do--- | <F. | 8 | 26.4 | | | 26.4 |
| 1248 | ---do--- | ---do--- | 35 | 65 | 4.0% A-1300 | ---do--- | <F. | 8 | 24.5 | | | 24.5 |

Mill Setting ca.: .005″ front roll; .010″ rear roll.

B.=bodied.
S. B.=slightly bodied.
F.=fluid.
<F.=will flow slightly.
D. T. D. O.=N-tallow trimethylene diamine dioleate.

Table II

[Humidity—(High).]

| Sample No. (7/28/53) | #1243 | #1244 | #1245 | #1246 | #1247 | #1248 | #1236 |
|---|---|---|---|---|---|---|---|
| Percent Coating | 2.0% D.T.D.O. | 3.0% D.T.D.O. | 4.0% D.T.D.O. | 2.0% A-1300 | 3.0% A-1300 | 4.0% A-1300 | None, Blank. |
| Starting Time | 8:45 a. m. | 8:49 a. m. | 8:55 a. m. | 8:58 a. m. | 9:00 a. m. | 9:01 a. m. | 9:02 a. m. |
| Dust Free Time | 4:00 p. m. | 4:00 p. m. | 4:00 p. m. | 4:00 p. m. | 4:00 p. m. | 4:00 p. m. | 4:00 p. m. |
| Tack Free Time, 125g./5 sec. | Over-night | Over-night | Over-night | Over-night | Over-night | Over-night | Over-night. |
| Tack Free Time, 100g./5 sec. | ---do--- | ---do--- | ---do--- | ---do--- | ---do--- | ---do--- | Do. |
| Tack Free Time, 200g./5 sec. | Between 18-24 Hours. | Between 18-24 Hours. | Between 18-24 Hours. | Between 18-24 Hours. | Between 18-24 Hours. | Between 18-24 Hours. | Between 18-24 Hours. |
| 24-Hour Pencil Hardness | 3B | 3B | 3B | 3B | 3B | 3B | 3B. |
| 48-Hour Pencil Hardness | | | | | | | |
| Heat Cured Panels, 1 hour, 275° F | Gloss, Good | Gloss, Good | Gloss, Good | Gloss, Good | Gloss, Good | Gloss, Good | Gloss, Poor. |
| Pencil Hardness | 2B | 2B | 2B | 2B | 2B | 2B | 2B |
| Settling Test | No Set | No | No | No | No | No | Yes. |
| Skinning | Some [1] | Some [1] | Some [1] | None | None | None | Some. |

[1] The use of N-tallow trimethylene diamine dioleate in this formulation of Iron Blue CB-50, and Long-Oil alkyd resin did not prevent skinning, while the samples containing the di-A-1300 salt of N-tallow trimethylene diamine showed no signs of skinning.

We have found that a paste consisting of 40 parts of iron blue and 60 parts castor oil, when passed over a roller mill once will gel. The addition of more castor oil to the formulation can prevent this, but this is not desirable because an excess will overplasticize the final lacquer film. Samples 1217, 1218 and 1219 in Table I are good examples of how the coating of N-tallow trimethylene diamine dioleate can correct this condition. Referring to the table, it will be seen that sample 1217 bodied so badly on one pass over the roller mill it could not be passed over the mill again. Sample 1218 was prepared with N-tallow trimethylene diamine dioleate added in the vehicle portion of the paste as a "wetting aid." This sample made a slightly better dispersion, but most important the paste consistency was sufficiently fluid to pass over the mill a second time. Sample 1219 is a pigment coated with N-tallow trimethylene diamine dioleate from an aqueous solution, which has lowered interfacial tension between pigment and oil to a minimum, leaving a very fluid paint which will disperse easily in one pass over the roller mill to an enamel grind of 7½ to 8 (as per Hegman gauge).

It will be seen from Table I that pigments coated according to the present invention will enable a paint manufacturer to formulate fluid pastes with high pigment ratios, and further to obtain a decrease in grinding time as well as to cut down the number of passes formerly required on the roller mill.

The data presented in Table II illustrates that the coating of the pigments according to the present invention has no effects in iron blue pigmented paints on final pencil hardness, dust free time, tack free time, color, gloss, and hiding power. Further, paints that contain either of the two coated pigments showed no signs of hard settling, or caking on standing, while the pigments of the control samples formed a hard cake at the bottom of the container.

Chrome green pigments are mixtures of iron blue with a very fine particle size of 0.05 micron, and chrome yellow with a relatively large particle size of 0.3 micron. Upon application of chrome green pigmented paints, the heavy chrome yellow particles settle in the paint film and the lighter and smaller iron blue particles are pushed to the surface of the film. This causes the green paint film to turn blue upon drying. We have found that flocculation in chrome green pigmented paints can be controlled if the chrome green pigment is coated in accordance with the present invention. The pigment particles so coated can no longer act independently of one another, and they will not migrate in the paint film to produce flooding and floating.

EXAMPLE II

A first sample of a chrome green pigment was coated with N-tallow trimethylene diamine dioleate according to the process of the present invention. A second sample of a chrome green pigment was coated with a petroleum sulfonate according to the conventional method. These two samples along with a third control sample were formulated into a pigment paste and subsequently into a finished paint composition. Table III lists the dispersion and roller mill data. Table IV summarizes the results of film characteristics.

fications) on the first pass over the mill in 8.2 seconds.

Referring to Table IV, the data illustrates that coating chrome green pigments with N-tallow trimethylene diamine dioleate does not impair gloss, pencil hardness, color and settling in chrome green paint.

There is some indication in the literature that chrome yellow pigments have a tendency to react with certain organic coating materials at high temperatures, and thereby cause discoloration of the paint upon baking. Because of this we prepared heat cured panels of the paints containing the coated pigments as well as the control. We found that chrome green pigments coated in accordance with our invention and made into a paint did not show any discoloration on heat curing. Further, our coated pigments produced a paint with a higher gloss, due to a more uniform dispersion.

EXAMPLE III

Two samples of iron blue pigments in the form of a water slurry containing 4.28 and 3.1 weight percent solid, respectively, and designated Iron Blue No. 10 and Iron Blue No. 10A, were treated as follows:

Four thousand (4000) parts by weight of sample No. 10 was divided into two equal parts of 2000 parts by weight each. The control was vacuum filtered and dried at 110° C. for 5 hours and 85.6 parts by weight of dry uncoated iron blue pulverized control was obtained. To the other 2000 parts by weight, 1.42 parts by weight of N-tallow trimethylene diamine diacetate dissolved in hot

*Table III*

ROLLER MILL DATA

| Sample No. | #1270 | #1273 | #1274 |
|---|---|---|---|
| Pigment | Chrome Green | Chrome Green | Chrome Green. |
| Vehicle | 52-R-13 Alkyd | 52-R-13 Alkyd | 52-R-13 Alkyd. |
| Pigment: Percent by Wt | 65 | 65 | 65. |
| Vehicle: Percent by Wt | 35 | 35 | 35. |
| Coating Material Applied from Aqueous Solution | None | Pet. Sulf | N-tallow trimethylene diamine dioleate. |
| Consistency of Paste | Med. heavy | Heavy | Thin. |
| 1st Pass on Mill: | | | |
| Grind No | 3 | 3 | 7½. |
| Grind Time, Sec | 7.8 | 7.6 | 8.2. |
| 2nd Pass on Mill: | | | |
| Grind No | 5 | 3½ | |
| Grind Time, Sec | 10.0 | 9.0 | |
| 3rd Pass on Mill: | | | |
| Grind No | 5½ | 6 | |
| Grind Time, Sec | 11.6 | 10.0 | |
| Final Grind No | 5½ | 6 | 7½. |
| Total Time Consumed | 29.4 | 26.6 | 8.2. |
| Passes Required | 3 | 3 | 1. |

*Table IV*

| Sample No. | #1270 | #1273 | #1274 |
|---|---|---|---|
| Heat Cured Panels—1 hour at 275° F.: | | | |
| Gloss Comparative | Poor | Good | Good. |
| Pencil Hardness | 2B | 2B | 2B. |
| Film Thickness | .002″ | .002″ | .002″. |
| Color | | Equal | |
| "Settling Test": Separation of Yellow and Blue Pigments | Yes, 24 hrs | Yes, 24 hrs | No, Still Dispersed after 3 months. |

Referring to Table III, the control sample No. 1270 had a grind of 3 (as per Hegman gauge) on the first pass over the mill; 5 on the second, and 5½ on the third. The total time consumed for all three passes was 29.4 seconds. Sample No. 1273 was treated with 3.0% by weight of petroleum sulfonate from a water slurry, filtered and dried. This sample passed over the mill in the first pass to produce a grind of 3, 3½ on the second pass, and a 6 on the third pass. The total grinding time for this sample was 26.6 seconds. Sample No. 1274 coated with 3.0% by weight of N-tallow trimethylene diamine dioleate, reached a grind of 7½ (enamel specifications)

water was added and mixed for 15 minutes. To this 1.84 parts of sodium oleate dissolved in hot water was added and agitated for about 15 minutes. The resulting slurry was vacuum filtered and dried at 110° C. for 5 hours. 85.6 parts by weight of pulverized 3% N-tallow trimethylene diamine dioleate coated iron blue was obtained.

Sample No. 10A was treated exactly as sample No. 10 except that the quantities of N-tallow trimethylene diamine diacetate and sodium oleate were such as to result in an ultimate coating of N-tallow trimethylene diamine dioleate on 3 weight percent on the coated pigments.

The coated and uncoated pigments were mixed with a linseed varnish and dispersed on a 3-roll mill. This data is recorded in Tables V and VI.

Table V
DISPERSION DATA FOR IRON BLUE #10
[3 Roll Mill.]

| Sample No. | #10 Control | #10 Coated |
|---|---|---|
| Vehicle Used | Linseed Varnish. | Linseed Varnish. |
| Vehicle by Wt | 60 parts | 60 parts. |
| Pigment by Wt | 40 parts | 40 parts. |
| Relative Viscosity | Lowest | |
| 1st Pass: | | |
| Grind No | 0 | 2. |
| Grind Time | 1' 43.0" | 1' 20.6". |
| 2nd Pass: | | |
| Grind No | <5 | 6. |
| Grind Time | 1' 15.9" | 1' 17.7". |
| Roll Setting: | | |
| Front | .001" | Unchanged. |
| Back | .015" | Do. |
| Oil Absorption | 51.0 | 41.0. |
| Total Time Consumed on Mill | 2' 58.9" | 2' 38.4". |

Table VI
ROLLER MILL DATA FOR IRON BLUE #10A

| Sample No | #10A Control | #10A Coated |
|---|---|---|
| Vehicle Used | Linseed Varnish. | Linseed Varnish. |
| Vehicle by Wt | 60 parts | 60 parts. |
| Pigment by Wt | 40 parts | 40 parts. |
| Relative Viscosity | Lowest | |
| 1st Pass: | | |
| Grind No | 0 | 0. |
| Grind Time | 2' 54.0" | 1' 02.3". |
| 2nd Pass: | | |
| Grind No | 1 | 2. |
| Grind Time | 1' 05.7" | 1' 00.6". |
| 3rd Pass: Grind No | 4 | 5. |
| Roll Setting: | | |
| Front | .001" | .001". |
| Back | .015" | .015". |
| Total Time Consumed on Mill | 3' 59.7" | 2' 03.4". |
| Oil Absorption | 75.4 | 64.5. |

Results of iron blue samples No. 10 and 10A coated pigments show a better dispersion and a decrease in the time consumed on the mill when compared to the uncoated controls. The actual time saving is much more pronounced on a large production basis. Assuming that it is expected to obtain an enamel grind of 6 with this blue pigment, it would be necessary to pass an uncoated pigment paste twice over a 5 roll mill. On the other hand, it would be possible to obtain a grind of 6 with one pass of a pigment coated in accordance with our invention. Therefore, the paint manufacturer can actually enjoy better than a 50% saving of time.

While this invention has been described and exemplified in terms of its preferred modification, it will be readily appreciated that many modifications and variations may be made without departing from the spirit and scope of the invention.

We claim:

1. A pigment particle uniformly coated with from ½ to 4 weight percent of a water-insoluble, oil soluble diacid salt of a N-aliphatic alkylene diamine, said diamine having the general formula R—NH—$(CH_2)_x$—$NH_2$ and said acid is selected from the group consisting of RCOOH and R—NH—A—COOH wherein R in each formula is an aliphatic hydrocarbon radical having from 12 to 22 carbon atoms, $x$ is an integer of from 2 to 10, and A is a divalent aliphatic hydrocarbon radical having from 2 to 3 carbon atoms.

2. A pigment particle uniformly coated with from ½ to 4 weight percent of a water-insoluble, oil soluble diacid salt of a N-aliphatic trimethylene diamine having the general formula R—NH—$CH_2CH_2CH_2$—$NH_2$, and said acid is selected from the group consisting of RCOOH and R—NH—A—COOH wherein R in each formula is an aliphatic hydrocarbon radical having from 12 to 22 carbon atoms and A is a divalent aliphatic hydrocarbon radical having from 2 to 3 carbon atoms.

3. A pigment particle uniformly coated with from ½ to 4 weight percent of a water-insoluble, oil soluble diacid salt of a N-aliphatic trimethylene diamine, said diamine having the general formula R—NH—$CH_2CH_2CH_2$—$NH_2$, and said acid having the formula RCOOH wherein R in each formula is an aliphatic hydrocarbon radical having from 12 to 22 carbon atoms.

4. A pigment particle uniformly coated with from ½ to 4 weight percent of a water-insoluble, oil-soluble diacid salt of a N-aliphatic trimethylene diamine, said diamine having the general formula $$R—NH—CH_2CH_2CH_2—NH_2$$

said acid having the formula R—NH—A—COOH wherein R in each formula is an aliphatic hydrocarbon radical having from 12 to 22 carbon atoms, and A is a divalent aliphatic hydrocarbon radical having from 2 to 3 carbon atoms.

5. A pigment particle uniformly coated with from ½ to 4 weight percent of N-tallow trimethylene diamine dioleate.

6. A pigment particle uniformly coated with from ½ to 4 weight percent of N-tallow trimethylene diamine di-N-Coco-aminobutyrate.

7. A pigment particle uniformly coated with from ½ to 4 weight percent of N-soya trimethylene diamine dioleate.

8. A pigment particle uniformly coated with from ½ to 4 weight percent of N-Coco trimethylene diamine dioleate.

9. A process comprising separately adding with agitation to an aqueous pigment system stoichiometric quantities of (A) a water-soluble salt of a N-aliphatic alkylene diamine of the formula R—NH—$(CH_2)_x$—$NH_2$, and (B) a compound selected from the group consisting of compounds having the formulas RCOOZ and $$R—NH—A—COOZ$$

wherein R in each of the foregoing formulas is an aliphatic hydrocarbon radical having from 12 to 22 carbon atoms, $x$ is an integer of from 2 to 10, Z is an alkali metal, and A is an aliphatic hydrocarbon radical having from 2 to 3 carbon atoms, to produce on the pigment particles a uniform coating constituting ½ to 4 weight percent of a water-insoluble, oil soluble diacid salt of a N-aliphatic alkylene diamine and an aqueous phase containing a dissolved alkali metal salt reaction product; and separating the thus-coated pigment from the aqueous phase.

10. A process comprising separately adding with agitation to an aqueous pigment system stoichiometric quantities of (A) a water-soluble salt of a N-aliphatic trimethylene diamine of the formula $$R—NH—CH_2CH_2CH_2—NH_2$$

and (B) a compound selected from the group consisting of RCOOZ and R—NH—A—COOZ wherein R in each of the foregoing formulas is an aliphatic hydrocarbon radical having from 12 to 22 carbon atoms, Z is an alkali metal, and A is a divalent aliphatic hydrocarbon radical having from 2 to 3 carbon atoms, to produce on the pigment particles a uniform coating constituting ½ to 4 weight percent of a water-insoluble, oil-soluble diacid salt of a N-aliphatic trimethylene diamine and an aqueous phase containing a dissolved alkali metal salt reaction product; and separating the thus-coated pigment from the aqueous phase.

11. A process comprising separately adding with agitation to an aqueous pigment system stoichiometric quantities of (A) a water-soluble salt of a N-aliphatic trimethylene diamine of the formula $$R—NH—CH_2CH_2CH_2—NH_2$$

and (B) a compound of the formula RCOOZ wherein R in each of the foregoing formulas is an aliphatic hydrocarbon radical having from 12 to 22 carbon atoms and Z is an alkali metal, to produce on the pigment particle a uniform coating constituting ½ to 4 weight percent of a water-insoluble, oil-soluble diacid salt of a N-aliphatic trimethylene diamine and an aqueous phase containing a dissolved alkali metal salt reaction product; and separating the thus-coated pigment from the aqueous phase.

12. A process comprising separately adding with agitation to an aqueous pigment system stoichiometric quantities of (A) a water-soluble salt of a N-aliphatic trimethylene diamine of the formula

R—NH—CH₂CH₂CH₂—NH₂ and (B) a compound of the formula R—NH—A—COOZ wherein R in each of the foregoing formulas is an aliphatic hydrocarbon radical having from 12 to 22 carbon atoms and A is a divalent aliphatic hydrocarbon radical having from 2 to 3 carbon atoms and Z is an alkali metal, to produce on the pigment particles the uniform coating constituting ½ to 4 weight percent of a water-insoluble, oil-soluble diacid salt of a N-aliphatic trimethylene diamine and an aqueous phase containing a dissolved alkali salt reaction product; and separating the thus-coated pigment from the aqueous phase.

13. A process comprising separately adding with agitation to an aqueous pigment system stoichiometric quantities of (A) a diacetate salt of a N-aliphatic trimethylene diamine of the formula

R—NH—CH₂CH₂CH₂—NH₂ and (B) an alkali metal oleate wherein R is an aliphatic hydrocarbon radical having from 12 to 22 carbon atoms, to produce on the pigment particles a uniform coating constituting ½ to 4 weight percent of a N-aliphatic trimethylene diamine dioleate and an aqueous phase containing dissolved alkali metal acetate; and separating the thus-coated pigment from the aqueous phase.

14. A process comprising separately adding with agitation to an aqueous pigment system stoichiometric quantities of (A) a diacetate salt of a N-aliphatic trimethylene diamine of the formula

R—NH—CH₂CH₂CH₂—NH₂ wherein R is an aliphatic hydrocarbon radical having from 12 to 22 carbon atoms and (B) an alkali metal N-Coco-aminobutyrate to produce on the pigment particels a uniform coating constituting ½ to 4 weight percent of N-aliphatic trimethylene diamine di-alkali metal-N-Coco-aminobutyrate and an aqueous phase containing dissolved alkali metal acetate; and separating the thus-coated pigment from the aqueous phase.

15. A process comprising separately adding with agitation to an aqueous pigment system in stoichiometric amounts (A) N-tallow trimethylene diamine diacetate and (B) sodium oleate to produce on the pigment particels a uniform coating constituting ½ to 4 weight percent of N-tallow trimethylene diamine dioleate and an aqueous phase containing dissolved sodium acetate; and separating the thus-coated pigment from the aqueous phase.

16. A process according to claim 9 wherein the water-soluble salt of the N-aliphatic alkylene diamine is added prior to the alkali metal compound.

17. A process according to claim 9 wherein the alkali metal compound is added prior to the water-soluble salt of the N-aliphatic alkylene diamine.

18. A process which comprises first adding with agitation to an aqueous iron blue pigment system a quantity of N-tallow trimethylene diamine diacetate; secondly, adding a stoichiometric quantity of sodium oleate to produce on the pigment particles a uniform coating constituting ½ to 4 weight percent of N-tallow trimethylene diamine dioleate and an aqueous phase containing dissolved sodium acetate; separating the thus-coated pigment from the aqueous phase and drying it at a temperature in the range of 95 to 110° C.

19. A process comprising separately adding with agitation to an aqueous iron blue pigment system a quantity of N-tallow trimethylene diamine diacetate; secondly, adding a stoichiometric quantity of sodium N-Coco-aminobutyrate to produce on the pigment particles a uniform coating constituting ½ to 4 weight percent of N-tallow trimethylene diamine di-sodium-N-Coco-aminobutyrate and an aqueous phase containing dissolved sodium acetate; separating the thus-coated pigment from the aqueous phase and drying same at a temperature in the range of 90 to 110° C.

References Cited in the file of this patent

UNITED STATES PATENTS

| | | |
|---|---|---|
| 2,126,925 | Ryan et al. | Aug. 16, 1938 |
| 2,192,956 | Sloan et al. | Mar. 12, 1940 |
| 2,442,972 | Edelstein | Jan. 8, 1948 |
| 2,709,160 | Korejwa et al. | May 24, 1955 |
| 2,728,682 | Kalenowiski et al. | Dec. 27, 1955 |
| 2,728,737 | Witcoff | Dec. 27, 1955 |
| 2,736,658 | Pfohl | Feb. 28, 1956 |